United States Patent [19]
Martin et al.

[11] 3,727,953
[45] Apr. 17, 1973

[54] TUBE COUPLING
[75] Inventors: Ronald C. Martin, Waterville, Ohio; Marty E. Sixt, Iowa City, Iowa
[73] Assignee: Advanced Drainage System, Inc., Newark, Del.
[22] Filed: Oct. 6, 1970
[21] Appl. No.: 78,444

Related U.S. Application Data

[63] Continuation-in-part of Ser. No. 796,752, Feb. 5, 1969, Pat. No. 3,551,007.

[52] U.S. Cl.............285/177, 285/305, 285/DIG. 4
[51] Int. Cl..............................................F16l 33/20
[58] Field of Search.................285/DIG. 4, DIG. 22, 285/177, 178, 424, 305, 399; 138/173

[56] References Cited

UNITED STATES PATENTS

| 290,045 | 12/1883 | Hardy | 285/178 |
|---|---|---|---|
| 3,551,007 | 12/1970 | Martin et al. | 285/156 |
| 2,789,841 | 4/1957 | Kramer | 285/177 |
| 2,556,627 | 6/1951 | Miksis | 285/177 |

FOREIGN PATENTS OR APPLICATIONS

| 627,065 | 9/1961 | Canada | 285/417 |
|---|---|---|---|
| 604,573 | 7/1948 | Great Britain | 285/417 |
| 908,930 | 10/1962 | Great Britain | 285/DIG. 22 |
| 21,926 | 1892 | Great Britain | 138/173 |

Primary Examiner—Andrew V. Kundrat
Attorney—Connolly & Hutz

[57] ABSTRACT

Flexible coupling for interconnecting ends of corrugated tubes of different cross-sectional diameters comprises tubular body section with two integral elongate portions having different cross-sectional diameters that correspond to the cross-sectional diameters of the tubes to be connected thereto. In one embodiment, slit in each end portion of tubular body section enables end portions of body section to fit tightly over corrugated tubes to be connected to coupling. In another embodiment, plurality of locking lugs formed in tubular body section at each end thereof project into interior of body section for positioning between corrugations of tubes to be connected thereto.

4 Claims, 8 Drawing Figures

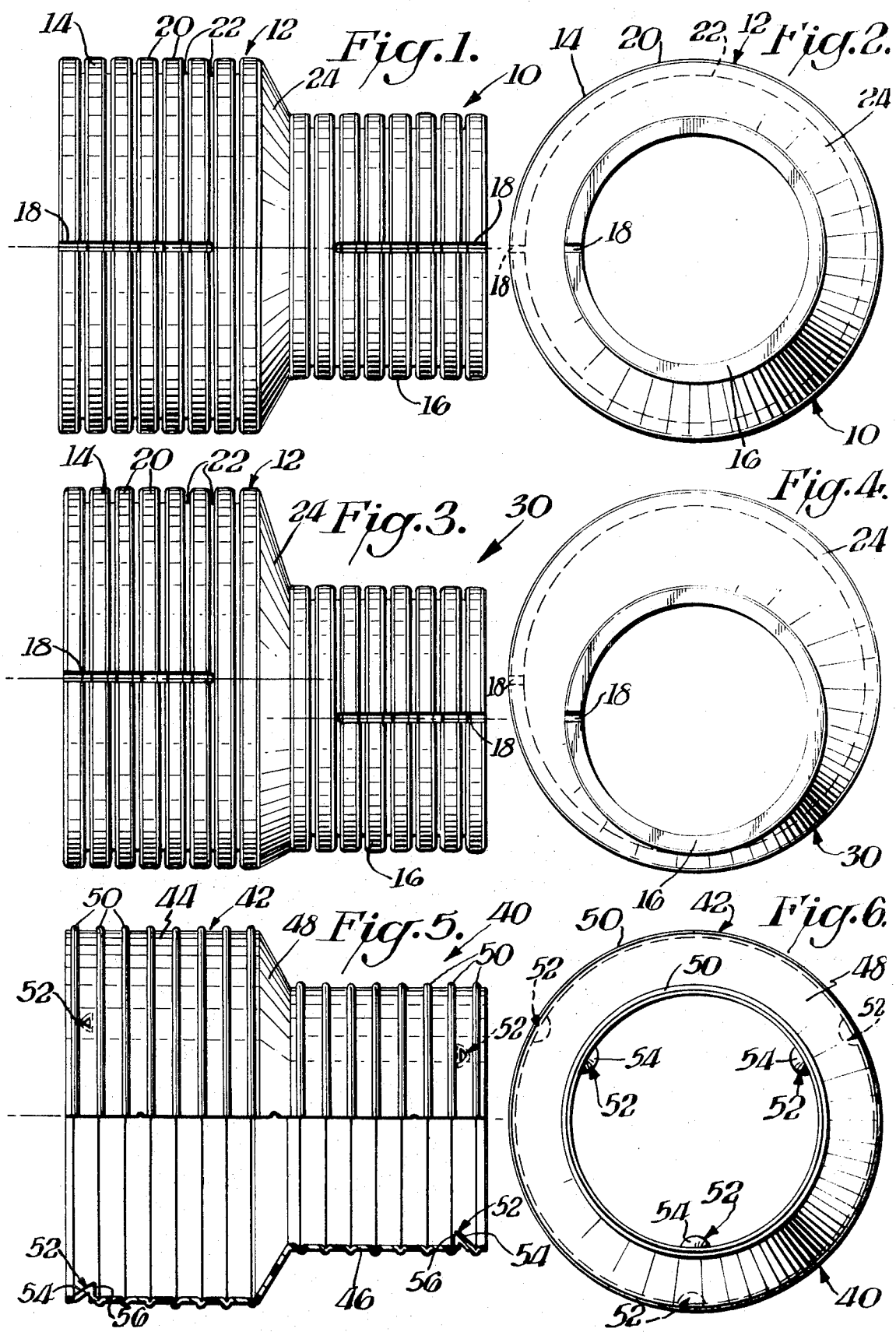

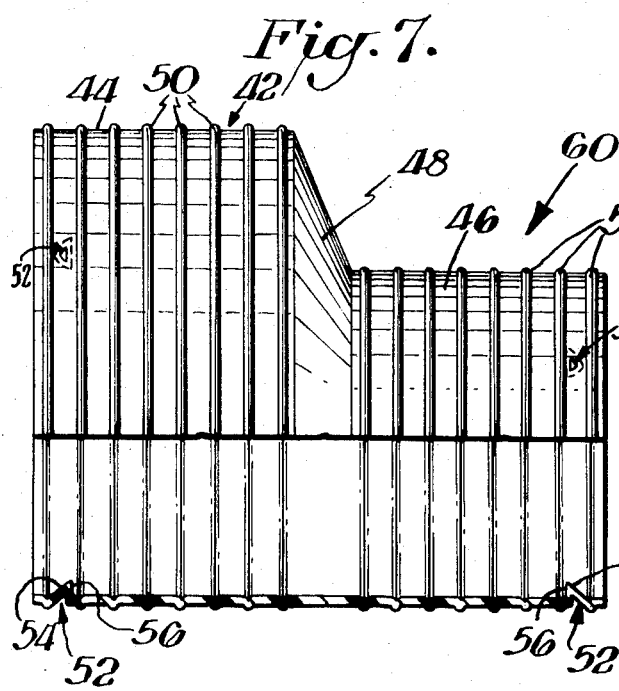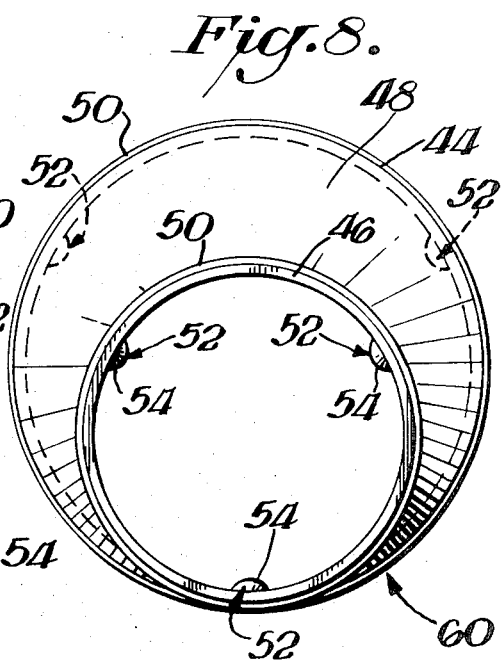

3,727,953

TUBE COUPLING

CROSS REFERENCE TO RELATED APPLICATION

The present application is a continuation-in-part of applicants' co-pending application Ser. No. 796,752, filed Feb. 5, 1969 and now U.S. Pat. No. 3,551,007.

BACKGROUND OF THE INVENTION

The present invention relates to couplings for corrugated tubes, and more particularly to flexible couplings for interconnecting corrugated drainage tubes having dissimilar cross-sectional configurations.

Subsurface drainage systems fabricated from corrugated tubes are currently playing a major role in land improvement. The advantages of corrugated drainage systems over the heretofore commonly used rod clay tile networks are quite numerous. The ease with which the corrugated tubing is manufactured in continuous lengths together with the rather simple and inexpensive installation procedures are but a few factors which have contributed to the overwhelming commercial success of corrugated drainage systems. For the most part these systems include main and lateral subsurface drainage lines comprising corrugated tubing, tees, wyes, couplings or connectors, and adapters of one kind or another. A typical system usually comprises a series of inclined lateral lines spaced from one another in parallel fashion on opposite sides of an inclined main line to which the laterals are connected by either tees or wyes. The lateral lines may be quite long and therefore require tubing of varying cross-sectional area in order to properly handle the ever-increasing volume of liquid being drained away through the system.

The required cross-sectional area of the tubing at a particular location in the system is determined by the rate of flow of the draining liquid. The larger flow rates occur at the lower ends of the inclined lateral lines near their points of connection to the main line. Tubing of increasing cross-sectional area may also be required in the main lines for the same reasons. Thus, interconnecting tubing of dissimilar cross-sectional configurations is often required in constructing subsurface drainage systems. Additionally, many times the trenches within which the tubing is to be laid do not meet at the same elevation, especially when the trenches are dug for drainage tubes of different cross-sectional configurations. Connecting tubes together at a point in the trench of varying elevation is both difficult and time consuming, and usually requires removal of additional earth or backfilling in the trench of lower elevation prior to positioning the tubing therein.

SUMMARY OF THE INVENTION

Accordingly, it is an object of the present invention to provide unique couplings for interconnecting the ends of corrugated tubes having dissimilar cross-sectional configurations.

Another object of the present invention is to provide couplings for interconnecting the ends of corrugated tubes positioned at slightly different elevations.

In accordance with the present invention a flexible coupling for interconnecting the ends of corrugated tubing having different cross-sectional diameters comprises a tubular body section having corrugations formed therein by alternating annular peaks and valleys. The tubular body section includes two integral elongate portions with different cross-sectional diameters that correspond to the cross-sectional diameters of the tubing to be connected thereto. A slit in the end of each elongate portion of the tubular body section terminates short of the mid-portion of the body section. Each slitted end portion of the tubular body section is constructed and arranged to tightly fit over corrugated tubes to be connected to the coupling so that corrugated tubes to be connected to the coupling may rotate relative to it.

The longitudinal center lines of the two integral elongate portions of the tubular body section may be parallel and displaced from one another. In one embodiment of the present invention, this displacement is less than the difference between the cross-sectional radii of the elongate portions of the tubular body section. Alternatively, the longitudinal center lines of the integral elongate portions of the tubular body section may coincide with one another.

In another embodiment of the present invention each end of a tubular body section comprising two integral elongate portions of different cross-sectional diameters has a plurality of locking lugs instead of the end slits. Each locking lug projects into the interior of the tubular body section and includes a guiding surface portion across which corrugated tubing slides when it is inserted into either end of the tubular body section for connection thereto. An abutment surface portion adjacent the guiding surface portion prevents removal of corrugated tubing from the tubular body section. Each locking lug is positioned between an adjacent pair of corrugations in tubing inserted into the tubular body section after the first corrugation of the adjacent pair clears the guiding surface portion so that removal of the tubing is prevented by engagement between the first corrugation of the adjacent pair and the abutment surface portions of the locking lugs.

In the embodiment having the locking lugs, the longitudinal center lines of the two integral elongate portions may be parallel and displaced from one another. The displacement may be approximately equal to the difference between the cross-sectional radii of the two integral elongate portions. Alternatively, the longitudinal center lines of the two integral elongate portions may coincide with one another.

Preferably, the abutment surface portion of each locking lug is planar and the guiding surface thereof is inclined to cam corrugated tubing into the tubular body section. Also, the planar surface portion of each locking lug is normal to the longitudinal axis of the tubular body section at the end thereof where the locking lugs are located. The guiding surface portion of each locking lug may be rounded.

BRIEF DESCRIPTION OF THE DRAWING

Novel features and advantages of the present invention in addition to those mentioned above will become apparent to those skilled in the art from a reading of the following detailed description in conjunction with the accompanying drawing wherein:

FIG. 1 is a side elevational view of a flexible coupling according to the present invention;

FIG. 2 is a right end elevational view of the flexible coupling shown in FIG. 1;

FIG. 3 is a side elevational view of another flexible coupling according to the present invention;

FIG. 4 is a right end elevational view of the flexible coupling shown in FIG. 3;

FIG. 5 is a side elevational view of still another flexible coupling according to the present invention;

FIG. 6 is a right end elevational view of the flexible coupling shown in FIG. 5;

FIG. 7 is a side elevational view of another flexible coupling according to the present invention; and FIG. 8 is a right end elevational view of the flexible coupling shown in FIG. 7.

DETAILED DESCRIPTION OF THE INVENTION

Referring in more particularity to the drawing, FIGS. 1 and 2 illustrate a flexible coupling 10 for interconnecting the ends of corrugated tubes having different cross-sectional diameters. The flexible coupling 10 comprises a tubular body section 12 including two integral elongate portions 14, 16. Each end portion of the tubular body section includes a slit 18 which enables the end portions of the body section 12 to be expanded to facilitate connection of corrugated tubing to the coupling 10. In this regard, the slits 18 enable the end portions of the flexible coupling 10 to be slightly expanded so as to increase the internal diameter of the end portions thereof. When an expanded end portion has an internal diameter slightly larger than the external diameter of a corrugated tube to be connected thereto, the tube is urged into mating engagement with the expanded end portion of the coupling and the force utilized to expand the end portion is then released thereby causing the coupling to tightly surround the end of the corrugated tube connected thereto.

As is clear from the drawing, the tubular body section 12 has corrugations formed by alternating annular peaks 20 and annular valleys 22. These corrugations are constructed and arranged to tightly fit over the corrugations of the tubes to be connected to the coupling. The annular relationship enables the corrugated tubes to be connected to the coupling to rotate relative to it. The interface of the two elongate portions 14, 16 comprises a frusto conical annulus 24, as best shown in FIG. 1.

In the embodiment of FIGS. 1 and 2, the longitudinal center lines of the two integral elongate portions 14, 16 of the tubular body section 12 coincide with one another. As is understandable from the drawing and the above description, the flexible coupling 10 is utilized to interconnect the ends of corrugated tubes having dissimilar cross-sectional areas.

FIGS. 3 and 4 illustrate an embodiment 30 of the present invention which in many respects is quite similar to the embodiment illustrated in FIGS. 1 and 2. Accordingly, portions of the flexible coupling 30 which are similar to portions of the coupling 10 have been identified by similar reference characters. Unlike the embodiment of FIGS. 1 and 2, in the flexible coupling 30 the longitudinal center lines of the two integral elongate portions 14, 16 of the tubular body section 12 are parallel and displaced from one another. The displacement is less than the difference between the cross-sectional radii of the integral elongate portions 14, 16. The flexible coupling 30 is utilized to interconnect the ends of corrugated tubes having dissimilar cross-sectional areas. The ends of the coupling are expanded in the same manner as described above to facilitate insertion of the tubes to be connected thereto. Trenches in which the corrugated tubes to be connected are located often have slightly different elevations at the point of connection between small and large cross-sectional area tubing. With the aid of flexible coupling 30 this difference in elevation is easily compensated for by simply rotating the coupling after each tube is connected thereto. Such rotation varies the distance between the longitudinal center lines of the elongate portions 14, 16 until the vertical distance therebetween is approximately equal to the elevational difference at the point of connection in the trench. Backfilling and/or further removal of earth is therefore unnecessary and the flexible coupling alone positions the connected tubing so that it rests in the bottom of the trench. Thus, the flexible coupling 30 also functions as an adapter for interconnecting the ends of corrugated tubes at locations in the trench that have slight elevational differences.

FIGS. 5 and 6 illustrate a flexible coupling 40 for interconnecting the ends of corrugated tubing having different cross-sectional diameters. The coupling comprises a tubular body section 42 having two integral elongate portions 44, 46 with different cross-sectional diameters that correspond to the cross-sectional diameters of the corrugated tubes to be connected thereto. The elongate portions are interconnected by an interface in the form of a frusto conical annulus 48. As shown best in FIG. 5, the tubular body section 42 has a series of spaced apart annular ribs 50 formed on the exterior surface of the flexible coupling 40.

A plurality of locking lugs 52 is formed in the tubular body section 42 at the open opposite ends thereof. As explained more fully below, the lugs 52 function to lock the corrugated tubes to the flexible coupling 40. Numerous procedures may be followed for forming the locking lugs 52 in the tubular body section 42, such as suction or blow molding techniques. Each locking lug 52 projects into the interior of the tubular body section 42 and includes a guiding surface portion 54 across which the corrugated tubing to be connected to the coupling slides when it is inserted into the tubular body section 42 for connection thereto. An abutment surface portion 56 located adjacent the guiding surface portion 54 of each locking lug 52 prevents removal of corrugated tubing from the tubular body section after it is inserted therein.

In operation, the flexible coupling 40 functions to positively interconnect the ends of corrugated tubes having different cross-sectional areas which correspond to the different cross-sectional areas of the two integral elongate portions 44, 46 of the tubular body section 42. Such positive interconnection is accomplished by locking the corrugated tubing to the coupling. This is brought about by forcing the ends of the corrugated tubes into the open ends of the tubular body section 42. Initially, the corrugated tubing strikes the guiding surface portions 54 of the locking lug 52 and as the tubing is urged into the tubular body section 42 of the coupling 40 it slides across the guiding surfaces. The internal dimension defined by the locking lugs 52 is slightly smaller than the external dimension of the tubing to be connected to the coupling 40. The flexible nature of the coupling together with the flexibility of the corrugated tubing enables the tubing to enter into the coupling and slide past the locking lugs 52. Finally, each of the locking lugs is positioned between an adjacent pair of corrugations in the tubing after the first corrugation of that adjacent pair clears the guiding surface portions 54. Removal of the tubing is prevented through engagement between the first corrugation of the adjacent pair and the abutment surface portions 56 of the locking lugs 52. The identical procedure is utilized for connecting the appropriate corrugated tube to the opposite end of the flexible coupling 40.

The abutment surface portion 56 of each locking lug 52 is planar and the guiding surface portion 54 is inclined and rounded so as to cam the corrugated tubing into the tubular body section 42. The planar abutment surface portion 56 of each locking lug 52 is substantially normal to the longitudinal axis of either of the two integral elongate portions 44, 46. Thus, with corrugated tubing having substantially flat interconnecting portions between the alternating annular peaks and annular valleys in the tubing the planar abutment surface portions 56 engage the flat portions of the tubing to thereby resist removal of the tubes from the flexible coupling 40.

The flexible coupling 40 of FIGS. 5 and 6 is quite similar to the flexible coupling 10 of FIGS. 1 and 2. The longitudinal center lines of the two integral elongate portions 44, 46 of the tubular body section 42 coincide with one another. Corrugated tubing is connected to the coupling 40 in the same manner described above. The tubes are free to rotate relative to the coupling after they are secured to it.

FIGS. 7 and 8 illustrate another flexible coupling 60 for interconnecting the ends of corrugated tubing having different cross-sectional diameters. The coupling 60 is very similar to flexible coupling 40 illustrated in FIGS. 5 and 6, and similar parts are identified by similar reference characters. The major difference between the flexible couplings 40 and 60 is that in the embodiment of FIGS. 7 and 8 the longitudinal center lines of the two integral elongate portions 44, 46 of the tubular body section 42 are parallel and displaced from one another by the difference between the cross-sectional radii of the elongate portions 44, 46. Corrugated tubes are connected to the flexible coupling 60 in the same manner as described above in conjunction with the flexible coupling 40 of FIGS. 5 and 6. Also, the eccentric relationship between the elongate portions 44, 46 enables corrugated tubes to be connected together at locations in a trench which have slight elevational differences. This particular feature of the present invention is described above in conjunction with coupling 30 of FIGS. 3 and 4.

What is claimed is:

1. A flexible coupling for interconnecting the ends of corrugated tubing having different cross-sectional diameters comprising a tubular body section having corrugations therein formed by alternating annular peaks and valleys, the tubular body section including two integral elongate portions with different cross-sectional diameters corresponding to the cross-sectional diameters of the tubes to be connected thereto, and a single slit in the end of each elongate portion of the tubular body section terminating short of the mid-portion of the body section, each slitted end portion of the tubular body section being constructed and arranged to tightly fit over corrugated tubing to be connected to the coupling whereby corrugated tubing to be connected to the coupling may rotate relative to it, and wherein the longitudinal center lines of the two integral elongate portions of the tubular body section are parallel and displaced from one another, the two integral elongate portions of the tubular body section having circular cross-sections of different radii and the longitudinal center lines of the elongate portions being displaced from one another less than the difference between the radii.

2. A flexible coupling for interconnecting the ends of corrugated tubing having different cross-sectional diameters comprising a tubular body section having two integral unbroken elongate portions with different cross-sectional diameters that correspond to the cross-sectional diameters of the corrugated tubing to be connected thereto, and a plurality of locking lugs formed in the tubular body section at each end thereof, each locking lug projecting into the interior of the tubular body section and including a guiding surface portion across which corrugated tubing slides when it is inserted into either end of the tubular body section for connection thereto, and an abutment surface portion adjacent the guiding surface portion for preventing removal of corrugated tubing from the tubular body section, each locking lug being positioned between an adjacent pair of corrugations in tubing inserted into either end of the tubular body section after the first corrugation of the adjacent pair clears the guiding surface portion whereby removal of the tubing is prevented by engagement between the first corrugation of the adjacent pair and the abutment surface portions of the locking lugs, said tubular body having a series of spaced apart annular ribs on the exterior surface thereof.

3. A flexible coupling as in claim 2 wherein the longitudinal center lines of the two integral elongate portions of the tubular body section are parallel and displaced from one another.

4. A flexible coupling as in claim 3 wherein the two integral elongate portions of the tubular body section have circular cross-sections of different radii and the longitudinal center lines of the elongate portions are displaced from one another by the approximate difference between the radii.

* * * * *